3,718,429
NO-NO₂ ANALYZER
James A. Williamson, Jr., Newark, Del., assignor to E. I. du Pont de Nemours and Company, Wilmington, Del.
Filed Mar. 15, 1971, Ser. No. 124,039
Int. Cl. G01n 21/24
U.S. Cl. 23—232 R                         32 Claims

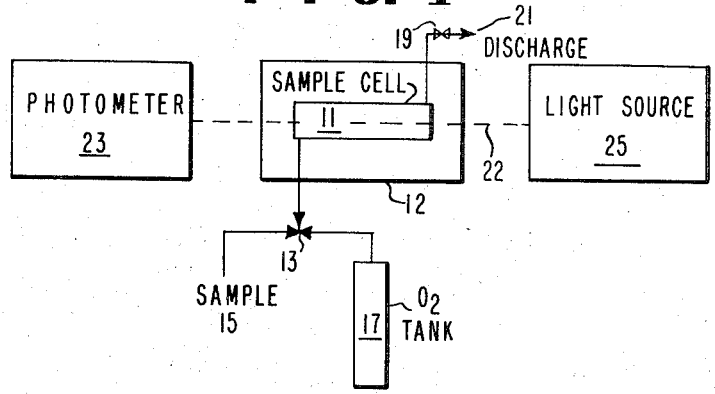
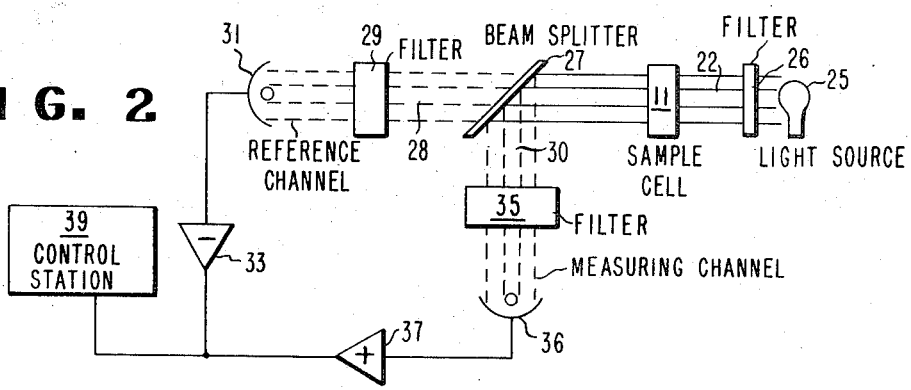
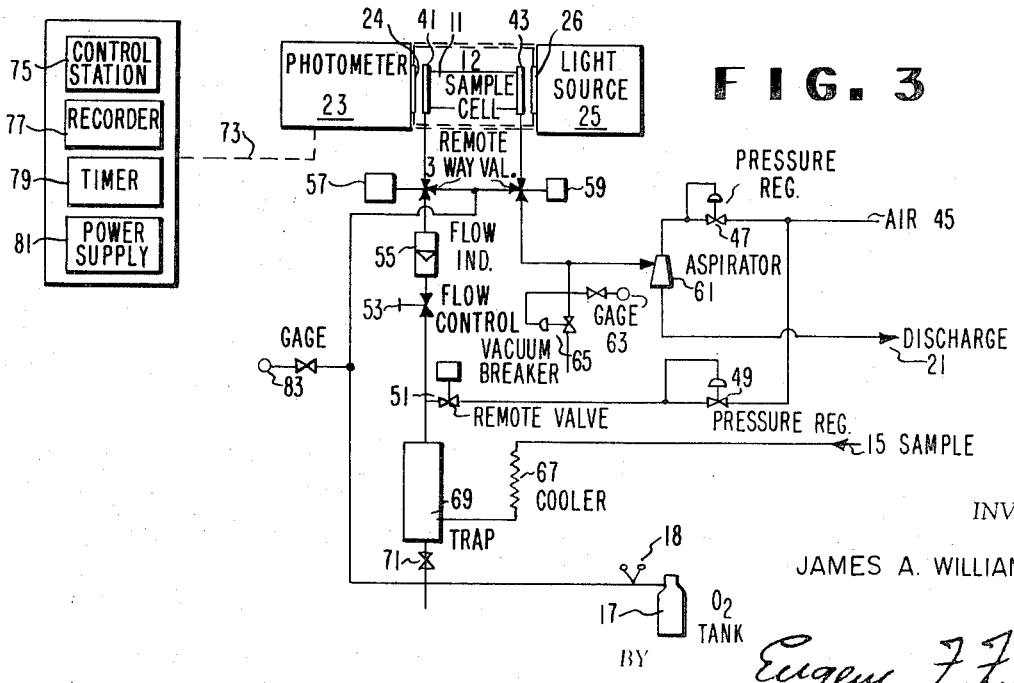

ABSTRACT OF THE DISCLOSURE

Apparatus and method for NO-NO₂ analysis in which a sample gas is placed in a pressure sample cell; measuring radiation in the 410–600 nm. range passed through the cell and detected; oxygen-containing gas introduced into the cell under pressure; the above radiation again passed through the cell and detected; and the temperature controlled after introducing the oxygen-containing gas. Preferably 4 atmospheres of substantially pure oxygen constitute the oxygen-containing gas; the above measuring radiation has a wavelength of about 436 nm.; radiation of about 546 nm. is passed through cell for reference purposes; and the presure within the cell is also controlled. When present, radiation below about 410 nm. should be excluded from the cell. Alternatively, the measuring radiation may be pased through the cell only after the oxygen-containing gas has been introduced therein.

BACKGROUND OF THE INVENTION

This invention relates to photometric analyses of gases for their nitric oxide (NO) and nitrogen dioxide (NO₂) contents in which NO is rapidly converted to NO₂ by oxygen under pressure.

Nitrogen oxides react with hydrocarbon pollutants in the air to form smog. Thus, the determination of the amounts of nitrogen oxides, particularly NO and NO₂, being released into the atmosphere from such sources as automobile exhausts and stack gases from nitration, nitric acid and power plants becomes important and desirable.

The NO₂ content of gases has previously been photometrically determined using visible radiation falling within the broad NO₂ absorption band centered at about 390 nm. However, NO lacks absorption in this wavelength region and remains undetected by this procedure. Efforts to use infrared radiation to detect NO have provided unsuccessful because of interference from other commonly present substances such as water and hydrocarbons.

To allow for the photometric determination of NO, it has been converted to NO₂ by the reaction $$2NO + O_2 \rightarrow 2NO_2$$

This has been accomplished by passing the sample gas through a solid or liquid oxidizing material or mixing it with ozone or oxygen.

A solid or liquid oxidant presents two problems. Since this method often requires taking a portion of the sample gas into a laboratory, it is not readily adaptable to in situ analysis, which thus limits or prevents continuous operation. Further, oxidizing chemicals may themselves be decomposed, are difficult to prepare, and generally require replacing.

Reacting NO with ozone produces NO₂ by a very fast reaction as pointed out by H. S. Johnston et al. in J. Chem. Phys. 22, 689 (1954). However this reaction has serious drawbacks that limit is usefulness in converting NO to NO₂ for the subsequent photometric determination of NO. Foremost amongst these is the reaction, $$NO_2 + O_3 \rightarrow N_2O_5 + O_2$$

which is competitively fast as shown by H. S. Johnston et al., J. Chem. Phys. 17, 386 (1949). This reaction causes erroneously low results in the determination of both NO and NO₂ since the N₂O₅ (and other higher oxidation states of nitrogen similarly produced) are invisible. Further ozone does not quantitatively convert NO to NO₂. This is aggravated by the reverse action of NO₂ to NO which is induced by the UV. radiation generally used to produce the ozone itself. Adidtionally, extra equipment is required to generate ozone.

The use of oxygen to convert NO to NO₂ has been beset with serious drawbacks which reduce its utility and the range of concentrations of NO and NO₂ over which it is effective, as shown in S. W. Nicksic et al., Analytical Chemistry 34, 987 (1962). In either the batch analysis or the continuous method, the reproducibility, accuracy, and range of concentrations are severely limited. Furthermore, this method does not allow for the separate measurements of NO and NO₂.

Thus it is an object of the present invention to provide a method and apparatus for the analysis of NO and NO₂ in a sample gas that is accurate, reliable, and effective over a wide range of concentrations, and which may allow for the separate analysis of NO and NO₂.

SUMMARY OF THE INVENTION

This and other objectives are accomplished by introducing the sample gas into a leak-tight pressure sample cell; passing visible radiation through to detect for NO₂; introducing an oxygen-containing gas under presusre; detecting again with visible radiation for the combined amounts of NO and NO₂; and controlling the cell temperature. Preferably, about 4 atmospheres of pure oxygen is added to about .5 to 1.5 atmospheres of the sample in the sample cell. Radiation below 410 nm., if present, should be exluded.

In addition to the detecting radiation, a second wavelength of radiation that is relatively less strongly absorbed by NO₂ may be used as a reference to compensate for the scattering of such substances as vapor mists and particulate matter in the sample. This reference radiation would be separately detected. For the more usual concentrations of NO and NO₂, the preferred combination of wavelengths is 436 nm. and 546 nm. for the detecting and reference radiations, respectively. In situations where higher concentrations are expected, the alternate preferred combination would be 546 nm. and 578 nm. for the detecting and reference radiations, respectively.

By effecting the NO to NO₂ conversion in the same cell and at the same time that the NO₂ itself is being detected, it is possible to follow the course of the reaction $$NO + O_2 \rightarrow NO_2$$

and in particular to observe the maximum amount of NO₂ thus produced, before appreciable quantities thereof are converted into N₂O₄ by the reaction $2NO_2 \rightarrow N_2O_4$. This dimerization reaction is slower than the NO to NO₂ conversion. Further, excluding, if present, radiation below 410 nm. assists in permitting this continuous determination of NO₂. Light of lower wavelength will produce the reverse of the desired reaction, i.e. $2NO_2 \rightarrow 2NO + O_2$. Thus, excluding the undesired radiation if necessary, allows the continuous observation of NO₂ without allowing the competing reverse reaction to occur.

Controlling the temperature of the sample cell and hence of the contents therein is also significant in providing accurate and reproducible results over a large range of concentrations. The basic NO to NO₂ conversion reaction proceeds faster at lower temperatures. Conversely, lower temperatures favor the production of the invisible dimer (in the equilibrium reaction $2NO_2 \rightleftharpoons N_2O_4$). However, it is possible to determine a temperature that effects a compromise between these two competing considerations and allow accurate determinations over large ranges of concentrations. The preferred usual temperature for these purposes is 50° C. When higher total concentrations of NO and $NO_2$ are expected, 100° C. may be used to limit the dimerization of $NO_2$. In general the cell temperature should be maintained within the range of from 0° C. to 125° C.

Controlling the pressure within the sample cell further increases the accuracy of the determinations. This is particularly so because it controls the amount of sample gas introduced into the cell. It may also be used to control the amount of the oxygen-containing gas mixed with the sample.

BRIEF DESCRIPTION OF THE FIGURES

FIG. 1 is a schematic representation of an apparatus of the present invention.

FIG. 2 shows a preferred photometer for use in the present invention.

FIG. 3 shows a detailed representation of a preferred embodiment of an apparatus of the present invention.

DETAILED DESCRIPTION OF THE INVENTION

The present invention photometrically determines the amounts of NO and $NO_2$ in a gas. It uses visible radiation having a wavelength of from 410 nm. to 600 nm. to determine the concentration of $NO_2$. NO is combined with an oxygen-containing gas, preferably substantially pure oxygen, under pressure in order to convert it to $NO_2$ and render it visible to the radiation. The sample cell in which $NO_2$ is detected and NO converted to $NO_2$ is maintained at a temperature that will limit the dimerization of $NO_2$ to $N_2O_4$ while allowing a relatively fast conversion of NO to $NO_2$. This temperature is generally 50° C., but for total concentrations of NO and $NO_2$ above about 1%, 100° C. has been found preferable. In general the temperature should be somewhere in the range of from 0 to 125° C. Advantageously, the pressure of the cell may be regulated in order to control the amounts of both the sample gas and the oxygen-containing gas introduced into it. Further, radiation at a wavelength that is absorbed less strongly by $NO_2$ than the detecting radiation may be used to compensate for scattering by particulate matter and mists in the sample. Generally 436 nm. and 546 nm. are preferred for the detecting and reference radiations, respectively. For higher concentrations of NO and $NO_2$, 546 nm. and 578 nm. may be used, respectively, as substitutes.

FIG. 1 shows the basic components of a system to accomplish the photometric determination of NO and $NO_2$ according to the present invention. A sample at 15 is passed through three way valve 13 into sample cell 11 which is contained within heated compartment 12. The sample may be from an auto exhaust, stack gases or otherwise. Sample cell 11 is leak tight and can withstand pressures of at least 2 atmospheres and preferably 5 atmospheres. Before the conversion of the NO to $NO_2$, i.e. when the $NO_2$ in the original sample is being measured, a specific sample may be contained in the cell or the gas may be continuously passed through the cell via valve 19 and out discharge 21 thus allowing a continuous analysis of $NO_2$. In either case, before the conversion of NO to $NO_2$, valve 19 is closed to retain a specified amount of sample within cell 11. The temperature of compartment 12 is controlled which in turn controls the temperature of cell 11 and its contents. After the determination of the $NO_2$ in the sample and the closing of valve 19, valve 13 then admits oxygen from the $O_2$ tank 17 into sample cell 11, to convert NO to $NO_2$. Other oxygen-containing gases, such as air, may be used instead of pure oxygen. In order to measure the $NO_2$, a light source 25 provides radiation 22 which passes through sample cell 11 and is detected by photometer 23. After measurement of the NO and $NO_2$ in the sample gas, valve 19 is opened and three way valve 13 positioned to pass further material for analysis from sample 15.

FIG. 2 displays a particularly suitable photometer for the present invention (which is manufactured by the Instrument Products Division of E. I. du Pont de Nemours and Co., Wilmington, Del.). Light source 25 may be of any suitable type although a mercury lamp is preferred. An optical filter 26 filters out radiation below 410 nm. from the light beam 22. A Corning CS 3–73 filter has been found suitable. The light then passes through sample cell 11 where it is absorbed by $NO_2$ and scattered by particulate matter and mists. After departing cell 11, light beam 22 is divided into two compartments by beam splitter 27 which in this case is a semitransparent mirror. Half of the beam 30 goes through filter 35 which blocks all but the measuring radiation (which is responsive to both $NO_2$ absorption and the scattering). Phototube 36 detects this radiation and its output is positively amplified by logarithmic amplifier 37. The second half 28 of the beam from beam splitter 27 is passed through filter 29 which excludes all but the reference wavelength of radiation. This reference radiation responds equally to the scattering in the cell as does the measuring radiation, but is relatively less affected by $NO_2$ adsorption. The radiation passing through filter 29 is detected by phototube 31 whose output is negatively amplified by logarithmic amplifier 33. The output of negative amplifier 33 effectively subtracts the scattering of radiation in the sample cell from the output of the measuring phototube 36, and, thus, leaves only the $NO_2$ absorption to reach control station 39. This data is then available for further use.

FIG. 3 depicts a preferred apparatus of the present invention. Photometer 23 and light source 25 are shown with windows 24 and 26, respectively, preferably of quartz. Sample cell 11 has windows 41 and 43 (preferably of quartz) and is within heated compartment 12. Power supply 81 powers light source 25, photometer 23, and remote valves 51, 57 and 59, and timer 79 controls the functioning of these valves. Control station 75, recorder 77, timer 79, and power supply 81 are connected to the rest of the system by electrical interconnection 73.

Air under pressure at 45 has two purposes. First, it continually provides gas pressure to aspirator 61 which creates a vacuum in the line towards the sample cell. This pressure to aspirator 61 is regulated by pressure regulator 47. After passing through aspirator 61, the air is then passed out discharge port 21.

The second function of the air 45 occurs during the apparatus' first cycle of operation. During this cycle, valve 51 is open and admits air pressure (regulated by pressure regulator 49) into the line connecting sample cell 11 to sample source 15. Part of the air pressure backflushes the sample line through trap 69 and cooler 67 to sample source 15 in order to cleanse the line in preparation for the next measurement. During this fast cycle, three way valve 57 is opened to permit the other part of the air pressure to flow into the sample cell 11, while valve 59 is open to permit the air pressure in sample cell 11 to flow through aspirator 61 and out discharge opening 21. In this manner, the sample cell and its connections are also cleansed. Since there is no sample in cell 11 while the air is thus flowing through it during this first cycle, the photometer output is set to 0. After cell 11 and its connecting lines are cleansed, valve 51 closes and isolates the air pressure from the line connecting sample cell 11 and sample 15 (although of course the air continues to operate aspirator 61).

The above closing of valve 51 begins the second cycle. During this cycle as in the first cycle three way valves 57 and 59 allow the passage of gas through valve 57 into one side of sample cell 11 and out the other side through valve 59, aspirator 61 and discharge port 21. The air pressure 45 through aspirator 61 creates a slight vacuum in the sample cell and its connecting lines. A vacuum of about 3 inches mercury at the aspirator 61 is convenient. Because of this slight vacuum in the sample cell and without the backflushing air pressure, the sample at 15 then flows forward through cooler 67, trap 69, flow control 53, flow indicator 55, valve 57, sample cell 11, valve 59, aspirator 61, and out discharge port 21. Cooler 67 is generally employed to reduce the temperature of samples from such hot sources as stack gases or auto exhausts, which are warmer than the desired reaction temperature (usually 50° C.) and would thus greatly reduce the rate of NO to $NO_2$ conversion. From cooler 67 the sample gas passes to trap 69 where moisture that condensed in cooler 67 is removed. Flow indicator 55 need only be occasionally checked to ascertain that flow control 53 is allowing the correct amount of sample to flow into sample cell 11.

Vacuum breaker 65 limits and controls the magnitude of the vacuum within sample cell 11 and its connecting lines with gauge 63 giving a visual indication of the vacuum. Vacuum breaker 65 bleeds in sufficient air to reduce the vacuum created by aspirator 61 to the desired magnitude. Because the pressure within sample cell 11 is thus accurately controlled the amount of sample within sample cell 11 is also accurately controlled. Accordingly, even while the samples flow through sample cell 11, the concentration of $NO_2$ within the sample may be accurately determined by light source 25 and photometer 23. This determination of $NO_2$ in the sample is made continuously and changes in concentration of $NO_2$ may be detected up to the time that the amount of NO within the sample is to be determined.

When a sample is within sample cell 11, three way valve 57 then closes in order to isolate the sample within the cell. Three way valve 59 however remains open sufficiently long for pressure (and hence the amount of sample) in sample cell 11 to be regulated and controlled by vacuum breaker 65. Then valve 59 closes and isolates the sample within sample cell 11.

During the succeeding third cycle, three way valves 57 and 59 both open to allow oxygen from $O_2$ tank 17 through gauge 18, past gauge 83 and valves 57 and 59, into both ends of sample cell 11. Admitting the oxygen into both ends of the sample cell engenders quicker and more efficient mixing of the oxygen with the sample. Because of the general inaccuracy of double gauges such as 18 on gas tanks, gauge 83 is attached to the line in order to allow for accurate adjustment of the valves on the oxygen tank. After the predesired amount of oxygen, usually about 4 atmospheres, has passed into sample cell 11, valves 57 and 59 then close off and isolate the mixture of sample gas and oxygen within sample cell 11.

Expanding the $O_2$ from tank 17 rather than compressing it as previously done helps avoid the high temperatures that cause reactions between $NO_2$ and other pollutants and result in erroneously low measurements.

The sample gas and oxygen within sample cell 11 are allowed to react to substantial completion of the NO to $NO_2$ conversion while further readings of the $NO_2$ absorption are taken via light source 25 and photometer 23. The increase of the $NO_2$ absorption after the introduction of $O_2$ as compared to before the introduction of the $O_2$ is determinative of the amount of NO within the original sample.

After the NO and $NO_2$ conversion and the subsequent determination of $NO_2$, valves 51, 57 and 59 open to admit air into sample cell and its connecting lines and the line to sample 15. This prepares the apparatus for the next determination and starts the first cycle thereof.

With the apparatus shown in FIG. 3, and with about .5 to 1.5 atmosphere sample and about 4 atmospheres of oxygen within sample cell 11, the complete $NO-NO_2$ analysis of the sample can generally be effected within 5 minutes. This analysis has been found effective for NO concentrations of from .005 to 20.000 mole percent of NO although these do not represent the limits of the system. The ranges of concentration that can be detected can be changed by using different reference and measuring wavelengths of radiation as discussed above, and changing the cell lengthes. For the latter, longer cell lengths (i.e. path lengths within the cell) for example, could be used for samples having smaller concentrations of NO and $NO_2$. For higher total concentrations of NO and $NO_2$ the temperature of the heated compartment 12 may be raised to limit dimerization which reduces the amount of $NO_2$ detected. Above about 1% combined total of NO and $NO_2$ 100° C. is preferred for the heated compartment.

Example

The apparatus of FIG. 3 was used in the analysis of auto emissions according to the procedure described in the Federal Register (volume 35, No. 219, Nov. 10, 1970 (part 2)). The auto exhaust is collected in a plastic sample bag, and an integrated sample of a 23-minute run of the automobile obtained. The NO and $NO_2$ in the exhaust were analyzed and compared with the Saltzman analysis for total oxides of nitrogen ($NO+NO_2$), set forth in B. E. Saltzman, Analytical Chemistry 26, 1949 (1954). The table shows the results. Tests E and F reveal rapid oxidation of nitric oxide to nitrogen dioxide on standing in the plastic sample bag. The analyzed NO concentration does not represent the NO content initially in the exhaust since it is oxidized in the bag even during the 23-minute sampling run. The photometric analyzer apparatus results correlated well with the Saltzman method (except possibly for test A which was suspected to be due to "set-up" problems).

Non-dispersive infrared (NDIR) analyses for the NO in the exhaust were also performed and were consistently higher than the photometric analyzer results as is often encountered in NDIR measurements. Interference from substances other than NO in the exhaust was indicated in these measurements. Thus, when the two methods were compared on standard samples containing 255 p.p.m. nitric oxide in dry nitrogen, very good agreement between them was attained.

TABLE

| Test | Results | Saltzman method |
|---|---|---|
| A: | | |
| NO | 12 | |
| $NO_2$ | 50 | |
| $NO + NO_2$ | 62 | 46, 45 |
| B: | | |
| NO | 6 | |
| $NO_2$ | 6 | |
| $NO + NO_2$ | 12 | 13, 14 |
| C: | | |
| NO | 28 | |
| $NO_2$ | 32 | |
| $NO + NO_2$ | 60 | 62, 63 |
| D: | | |
| NO | 12 | |
| $NO_2$ | 62 | |
| $NO + NO_2$ | 74 | 62, 63 |

| | Results after— | | | | |
|---|---|---|---|---|---|
| | 20 min. | 30 min. | 40 min. | 80 min. | |
| E: | | | | | |
| NO | 22 | 17 | 15 | 10 | |
| $NO_2$ | 11 | 20 | 23 | 29 | |
| $NO + NO_2$ | 33 | 37 | 38 | 39 | 39 |
| F: | | | | | |
| NO | 37 | 25 | 19 | | |
| $NO_2$ | 76 | 88 | 94 | | |
| $NO + NO_2$ | 113 | 113 | (113) | | 105, 107 |

What is claimed is:

1. A method for measuring the concentration of NO and $NO_2$ in a sample gas comprising:
   (a) introducing said sample gas into a gas-tight sample cell;
   (b) introducing at least about 1 atmosphere of an oxygen-containing gas into said cell;
   (c) controlling the temperature of said cell;
   (d) passing radiation of between about 410–600 nm. through said sample cell with said sample gas and said oxygen-containing gas therein;

(e) detecting the transmittance of said radiation of between about 410–600 nm. through said cell, the absorbance of said radiation of between about 410–600 nm. in said cell being indicative of the amount of NO and $NO_2$ in said sample gas.

2. The method of claim 1 wherein radiation of about 546 nm. is passed through said cell and additional radiation of about 578 nm. is passed through said cell as a reference.

3. The method of claim 1 wherein said oxygen-containing gas is substantially pure oxygen.

4. The method of claim 1 wherein about 4 atmospheres of said oxygen-containing gas is introduced into said cell.

5. The method of claim 1 wherein radiation below about 410 nm. is excluded from said cell.

6. The method of claim 1 wherein radiation of about 436 nm. is passed through said cell.

7. The method of claim 6 wherein radiation of about 546 nm. is passed through said cell with said sample gas therein and detected as a reference.

8. The method of claim 1 wherein the pressure within said cell is controlled during said introducing of said sample gas.

9. The method of claim 8 wherein said pressure within said cell during said introducing of said sample gas is maintained at about three inches Hg less than atmospheric pressure.

10. A method for determining the amounts of NO and $NO_2$ in a sample gas comprising:
   (a) introducing said sample gas into a gas-tight sample cell;
   (b) passing radiation of between about 410–600 nm. through said sample cell with said sample gas therein;
   (c) detecting the transmittance of said radiation of between about 410–600 nm. passing through said cell, the absorption of said radiation of between about 410–600 nm. indicating the amount of $NO_2$ in said sample gas;
   (d) controlling the temperature of said sample cell;
   (e) thereafter introducing at least one atmosphere of an oxygen-containing gas into said sample cell with said sample gas therein;
   (f) passing radiation of between about 410–600 nm. through said sample cell with said sample gas and said oxygen-containing gas therein;
   (g) detecting the intensity of said radiation passing through said sample cell with said sample and said oxygen-containing gases therein, the difference in the absorbance detected before and after adding said oxygen-containing gas being indicative of the amount of NO in said sample gas.

11. The method of claim 10 wherein radiation of about 546 nm. is passed through said cell and additionally radiation of about 578 nm. is passed through said cell as a reference.

12. The method of claim 10 wherein at least about 4 atmospheres of said oxygen-containing gas is introduced into said cell.

13. The method of claim 10 wherein said oxygen-containing gas is substantially pure oxygen.

14. The method of claim 10 wherein radiation below 410 nm. is excluded from said cell.

15. The method of claim 10 wherein the temperature of said cell is maintained at a temperature within the range of about from 0° C. to 125° C.

16. The method of claim 10 wherein radiation of about 436 nm. is passed through said cell.

17. The method of claim 16 wherein radiation of about 546 nm. is passed through said cell with said sample gas therein and detected as a reference.

18. The method of claim 10 wherein the pressure within said cell is controlled during said introducing of said sample gas.

19. The method of claim 18 wherein said pressure within said cell during said introducing of said sample gas is maintained at about 3 inches Hg less than atmospheric pressure.

20. An apparatus for determining the amounts of NO and $NO_2$ in a sample gas comprising in combination:
   (a) a gas-tight sample cell capable of containing at least about two atmospheres pressure, said sample cell having windows therein permitting the passage of radiation through said cell;
   (b) means for introducing said sample gas into said cell;
   (c) a source of radiation of between about 410–600 nm. positioned to pass said radiation through said cell;
   (d) means for detecting said radiation between 410–600 nm. passing through said cell;
   (e) means for introducing an oxygen-containing gas into said cell with said sample gas;
   (f) pressurizing means for establishing within said cell a pressure of at least about 2 atmospheres; and
   (g) means for controlling the temperature of said cell.

21. The apparatus of claim 20 wherein said means for introducing an oxygen-containing gas introduces said oxygen-containing gas into said cell separately from said sample gas.

22. The apparatus of claim 21 wherein said sample cell is capable of containing at least about 5 atmospheres pressure and said pressurizing means is a means for establishing within said cell a pressure of at least about 5 atmospheres.

23. The apparatus of claim 21 wherein means are provided for excluding radiation below about 410 nm. from said cell.

24. The apparatus of claim 21 including means for controlling the pressure within said cell.

25. The apparatus of claim 21 wherein a said source of radiation is a source of about 546 nm. radiation.

26. The apparatus of claim 25 wherein source of reference radiation is positioned to pass radiation of about 578 nm. through said cell.

27. The apparatus of claim 21 wherein said source of radiation is a source of about 436 nm. radiation.

28. The apparatus of claim 27 wherein a source of reference radiation is positioned to pass radiation of about 546 nm. through said cell.

29. The apparatus of claim 28 wherein said source of radiation of about 436 nm. is also said source of 546 nm. radiation.

30. The apparatus for determining the amounts of NO and $NO_2$ in a sample gas comprising in combination:
   (a) a gas-tight sample cell capable of containing at least about 5 atmospheres pressure, said cell having windows therein permitting the passage of radiation of about 436 nm. and 546 nm. through said cell;
   (b) means for introducing about 0.5 to 1.5 atmospheres of said sample gas into said cell;
   (c) means for providing radiation of about 436 nm. positioned to pass said 436 nm. radiation through said cell;
   (d) means for providing reference radiation of about 546 nm. positioned to pass said 546 nm. radiation through said cell;
   (e) means for detecting said 436 nm. radiation passing through said cell;
   (f) means for detecting said 546 nm. radiation passing through said cell;
   (g) means for separately introducing approximately 4 atmospheres of an oxygen-containing gas into said cell with said sample; and
   (h) means for maintaining said cell at a substantially constant temperature.

31. The apparatus of claim 30 wherein a single radiation source provides said 436 nm. radiation and said 546 nm. radiation.

32. The apparatus of claim 30 including means for controlling the pressure within said cell.

References Cited

UNITED STATES PATENTS

| | | | |
|---|---|---|---|
| 2,974,227 | 3/1961 | Fisher et al. | 250—43.5 R |
| 3,545,872 | 12/1970 | Noack | 250—43.5 R X |

OTHER REFERENCES

Johnston et al., J. Chem. Phys. 22, No. 4, April 1954, 689–692.

Ripley et al., Int. J. Air Wat. Poll., Pergamon Press 1964, vol. 8, pp. 455–463.

MORRIS O. WOLK, Primary Examiner

R. M. REESE, Assistant Examiner

U.S. Cl. X.R.

23—254 R; 250—43.5 R